US012293180B2

(12) United States Patent
Fox et al.

(10) Patent No.: US 12,293,180 B2
(45) Date of Patent: May 6, 2025

(54) CLIENT CUSTOMIZED MULTIFUNCTION ROBOT

(71) Applicant: XTEND AI Inc., Middleburg, FL (US)

(72) Inventors: Harry Fox, Jerusalem (IL); Boris Zlotnikov, Tel Aviv (IL); Jacob Benjamin, Maale Adumim (IL); Ronnie Wulfsohn, Bat Ayin (IL); Betsalel Topper, Jerusalem (IL); Andrew Gorelick, Ashkelon (IL); Efraim Spiro, Jeruslem (IL)

( * ) Notice: Subject to any disclaimer, the term of this patent is extended or adjusted under 35 U.S.C. 154(b) by 0 days.

(21) Appl. No.: 18/236,002

(22) Filed: Aug. 21, 2023

(65) Prior Publication Data

US 2025/0004744 A1  Jan. 2, 2025

Related U.S. Application Data

(60) Provisional application No. 63/523,929, filed on Jun. 29, 2023.

(51) Int. Cl.
*G06F 8/65* (2018.01)
*G06V 10/94* (2022.01)
*G06V 40/16* (2022.01)

(52) U.S. Cl.
CPC .............. *G06F 8/65* (2013.01); *G06V 10/95* (2022.01); *G06V 40/172* (2022.01)

(58) Field of Classification Search
USPC ........................................................ 717/173
See application file for complete search history.

(56) References Cited

U.S. PATENT DOCUMENTS

| 10,265,227 B2 * | 4/2019 | Wen ...................... B25J 11/009 |
| 2006/0149418 A1 | 7/2006 | Anvari |
| 2007/0208442 A1 | 9/2007 | Perrone |
| 2010/0325623 A1 * | 12/2010 | Ikeda ................... G05B 19/414 |
| | | 901/6 |
| 2016/0129592 A1 | 5/2016 | Saboo |
| 2017/0352041 A1 * | 12/2017 | Ramamurthy ......... G06N 5/043 |

(Continued)

FOREIGN PATENT DOCUMENTS

DE       202023105333       11/2023

OTHER PUBLICATIONS

"EZ-Robot"; EZ-Robot.com website [full URL in ref.] as captured by the Wayback Machine Internet Archive (archive.org) on Feb. 8-Mar. 26, 2023 (Year: 2023).*
"Webots User Guide R2023b"; Cyberbotics.com website [full URL in ref.]; Jun. 28, 2023 (Year: 2023).*

(Continued)

*Primary Examiner* — Qing Chen
*Assistant Examiner* — Clint Thatcher
(74) *Attorney, Agent, or Firm* — JMB DAVIS BEN-DAVID (57) ABSTRACT

A system for customizing a robot for client use, including a central server computer, a robotic operation control kit to control functionality of the robot, wherein the robotic operation control kit is stored on the central server to be downloaded by the robot to control general robot functionality that is not client specific, a client customizing application at the central server, which is accessible by a client to customize an application layer that is configured to be downloaded to the robot and cooperate with the robotic operation control kit to provide functionality of the robot; wherein the application layer controls client specific robot functionality.

22 Claims, 3 Drawing Sheets

(56) References Cited

U.S. PATENT DOCUMENTS

| | | | |
|---|---|---|---|
| 2018/0052451 | A1 | 2/2018 | Billi-Duran et al. |
| 2019/0015990 | A1* | 1/2019 | Hillen ................. G06K 7/1417 |
| 2019/0105783 | A1 | 4/2019 | Al Moubayed et al. |
| 2021/0252698 | A1 | 8/2021 | Paxton |
| 2021/0279475 | A1* | 9/2021 | Tusch ................. H04L 63/0861 |
| 2022/0305648 | A1 | 9/2022 | Oleynik |
| 2023/0244230 | A1* | 8/2023 | Fox ..................... G05D 1/0246 |
| | | | 700/250 |
| 2023/0266753 | A1* | 8/2023 | Landry ................ G05D 1/0088 |
| | | | 701/2 |
| 2023/0286167 | A1* | 9/2023 | Klingensmith ...... B25J 11/0035 |
| | | | 700/245 |
| 2023/0325174 | A1* | 10/2023 | Lee ...................... B25J 9/1656 |
| | | | 717/168 |

OTHER PUBLICATIONS

"The EZ Robot Review"; robots-and-androids.com website [full URL in ref.] as captured by the Wayback Machine Internet Archive (archive.org) on May 19, 2023 (Year: 2023).*

"EZ-Robot Educators Guide: JD Humanoid"; EZ-Robot.com website; Feb. 15, 2019 (Year: 2019).*

Gherardi et al. "A software product line approach for configuring cloud robotics applications", 2014 IEEE 7th International Conference on Cloud Computing, IEEE, 2014, retrieved on Sep. 17, 2024 (Sep. 17, 2024).

Paterno et al. "End-user development for personalizing applications, things, and robots", International Journal of Human-Computer Studies 131 (2019): 120-130, retrieved on Sep. 17, 2024 (Sep. 17, 2024).

* cited by examiner

CLIENT CUSTOMIZED MULTIFUNCTION ROBOT

CROSS REFERENCE TO RELATED APPLICATIONS

Applicant claims priority and the benefit of U.S. provisional application 63/523,929, filed Jun. 29, 2023, the disclosure of which is incorporated herein by references.

FIELD OF THE DISCLOSURE

The present disclosure relates to robots and to robots that can operate offline and online.

BACKGROUND OF THE DISCLOSURE

Robots in the modern day fall generally into two categories. The first is an unintelligent robot with hyper-specific functionality, usually on assembly lines. The second is an intelligent, general function, sometimes mobile, robot that may use intelligence derived from both artificial intelligence (such as Cloud Artificial Intelligence) or from the processing of operational algorithms such as facial and object recognition, audio recognition etc.

Intelligent robots are becoming more and more part of everyday life. Such robots are used (for example) for medical care support, as waiters in restaurant, for takeaway deliveries and other tasks.

The intelligent robots are typically controlled by a server which stores their data and functionality. The processing power needed to operate such robots typically requires large and costly processors and peripherals. In order to be controlled by the server and have access to data, resources and services, the robot is required to have some form of communication means with the server such as Bluetooth, Wi-Fi, Zigbee etc.

An intelligent online robot typically has access to a very large amount of data. With this data it can reliably pull operational data, or any other data, as needed. The server ensures keeping the data up to date. Without the online data, it is very difficult to have a robot with complex functionality operate. It may be appreciated that a robot may not always be in communication with its server during its use. For example, a power outage could cause a Wi-Fi connection to fail, leaving the robot offline. Alternatively, the robot may be out of range of communication with its server. Thus, in order for the robot to perform autonomously offline, it would therefore require the full functionality provided by the server to be stored locally on the robot requiring large and expensive processors and storage capabilities. This full functionality may also include the processing power to run heavy operational algorithms in order to support the intelligence it requires in order to make decisions to operate independently.

Typically, it is not practical nor cost effective to fit an entire server processing unit and storage onto an individual robot in order for it to have the full gamut of functionality available when offline.

To effect an offline robot, the processors are generally larger and more costly than the average processor of a similar robot that operates using a server, as an online robot can offload to the server much of the strenuous processing that would normally fall on the robot's processors. As the herein disclosed robot operates offline, that cannot be done. Accordingly, the processors of the robots in the current disclosure are much smaller than the average server processor, as you cannot fit an entire server processing unit onto each robot at any reasonable size or cost-effectiveness. Therefore, the processors are stronger than for the average online robot and weaker than the average server processor.

Application Ser. No. 18/149,183 filed Jan. 3, 2023 (published on Aug. 3, 2023 as US 2023/0244230) the disclosure of which is incorporated herein by reference discloses a robot system that is configured to function online and offline by downloading functional modules from the server. Preparation of the functional modules for each client places a heavy burden on the manufacturer in developing such a robot for a client.

Accordingly, there is a need in the industry and field for a device or system that can efficiently and effectively reduce the burden of preparation of a robot for a specific client by the manufacturer.

SUMMARY OF THE DISCLOSURE

To achieve these and other objects, the herein device can efficiently and effectively reduce the burden of preparation of a robot for a specific client by the manufacturer.

Therefore, to achieve these and other objects, the herein disclosed invention is a system for customizing a robot for client use, comprising: a central server computer; a robotic operation control kit to control functionality of the robot, wherein the robotic operation control kit is stored on the central server to be downloaded by the robot to control general robot functionality that is not client specific; and, a client customizing application at the central server, which is accessible by a client to customize an application layer that is configured to be downloaded to the robot and cooperate with the robotic operation control kit to provide functionality of the robot; wherein the application layer controls client specific robot functionality.

An aspect of an embodiment of the disclosure, relates to a system for customizing a robot. The system includes a central server, which is provided with a robotic operation control kit. The robotic operation control kit is downloaded to the robot to serve as an application for defining basic functionality of the robot that is independent of the client using the robot. The central server further comprises a customizing application that is accessible by a client to define an application layer, which is downloaded to the robot to cooperate with the robotic operation control kit by controlling client specific robot functionality.

The client may access the central server using a client server. The client server may access the central server to create the application layer and store the application layer at the central server or at the client server. Alternatively, the client server may download the customizing application from the central server to the client server and form the application layer locally at the client server.

The robot is configured to download the application layer from the central server or the client server respectively.

There is thus provided according to an embodiment of the disclosure, a system for customizing a robot for client use, comprising:
  A central server computer;
  A robotic operation control kit to control functionality of the robot, wherein the robotic operation control kit is stored on the central server to be downloaded by the robot to control general robot functionality that is not client specific;
  A client customizing application at the central server, which is accessible by a client to customize an application layer that is configured to be downloaded to the robot and cooperate with the robotic operation control kit to provide functionality of the robot; wherein the application layer controls client specific robot functionality.

In an embodiment of the disclosure, the system further comprises a client server that is configured to access the central server to customize the application layer and store the application layer at the central server; wherein the application layer is configured to be downloaded from the central server by the robot. Alternatively, the system further comprises a client server that is configured to access the central server to customize the application layer and store the application layer at the client server; wherein the application layer is configured to be downloaded from the client server by the robot. Further alternatively, the system further comprises a client server that is configured to access the central server to download the customization application to the client server, customize the application layer and store the application layer at the client server; wherein the application layer is configured to be downloaded from the client server by the robot.

In an embodiment of the disclosure, the robotic operation control kit controls access to sensors and motors of the robot. Optionally, the application layer provides client data to the robotic operation control kit to enable performing client face recognition. In an embodiment of the disclosure, the robotic operation control kit communicates with sensors and motors of the robot via a communication broker that receives communications from the robotic operation control kit and provides them to the sensors and motors subject to availability. Optionally, the robotic operation control kit and application layer are configured to delegate processing processes to the central server when functioning online. In an embodiment of the disclosure, the robotic operation control kit is configured to receive upgrades from the central server. Optionally, the application layer is configured to receive upgrades from the client server.

There is further provided according to an embodiment of the disclosure, a method of customizing a robot, comprising:
Storing a robotic operation control kit on a central server computer; wherein the robotic operation control kit is configured to control general robot functionality that is not client specific;
Customizing an application layer by a client that has access to a client customizing application at the central server; wherein the application layer controls client specific robot functionality;
Downloading the robotic operation control kit to the robot;
Downloading the customized application layer;
Wherein the application layer is configured to cooperate with the robotic operation control kit to provide functionality of the robot.

In an embodiment of the disclosure, a non-transitory computer readable storage medium comprises instruction that when executed by a computer are configured to perform the above method.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

In the following detailed description, numerous specific details are set forth in order to provide a thorough understanding of the invention. However, it will be understood by those skilled in the art that the present invention may be practiced without some of those specific details. In other instances, well-known methods, procedures, and components have not been described in detail so as not to obscure the present invention.

In a an embodiment, the Invention constitutes a system for customizing a robot for client use, comprising: a central server computer; a robotic operation control kit to control functionality of the robot, wherein the robotic operation control kit is stored on the central server to be downloaded by the robot to control general robot functionality that is not client specific; and, a client customizing application at the central server, which is accessible by a client to customize an application layer that is configured to be downloaded to the robot and cooperate with the robotic operation control kit to provide functionality of the robot; wherein the application layer controls client specific robot functionality.

Figure 1:
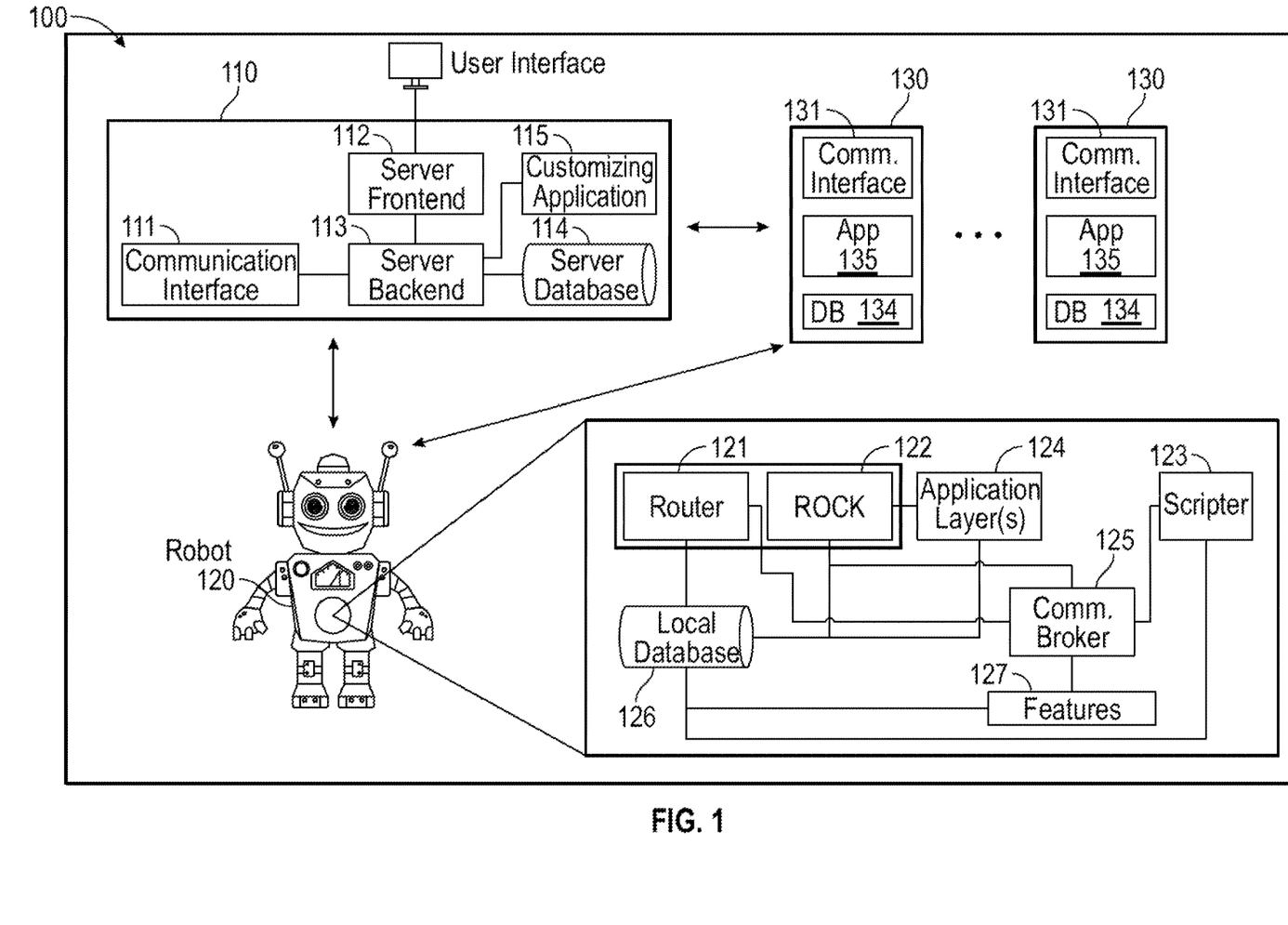
FIG. 1 is a schematic illustration of a system for preparing a client customized robot, according to an embodiment of the disclosure.

FIG. 1 is a schematic illustration of a system 100 for preparing a client customized robot 120, according to an embodiment of the disclosure. System 100 includes a central server 110 that is configured to provide robots 120 with a robotic operation control kit (ROCK) 122. The robotic operation control kit 122 is a generic and raw robot functioning and managing portal or software development kit (SDK), which is configured to provide basic functionality of the robot 120 when offline or online. The robotic operation control kit 122 is configured to function in conjunction with an application layer 124 that is customized by robot clients optionally with a client server 130 according to their needs. The application layer 124 is a non-generic customizable or malleable front end and logical flow portal to handle the user experience (UX) and user interface (UI) of the robot. Accordingly, the robotic operation control kit 122 handles generic robot functionality and application layer 124 handles client specific robot functionality.

In an embodiment of the disclosure, the robotic operation control kit 122 is prepared, provided and updated by the robot manufacturer or designer on central server 110. The robotic operation control kit 122 is generic for all robots 120 of a specific model and does not include client specific data, for example client specific algorithm modules, client policies and procedures, client information such as employee information, employee pictures (e.g., for face recognition), client location information (e.g., office maps) and other client relevant data. Optionally, application layer 124 is prepared, provided and updated by a client server 130 to provide the robot 120 with client specific data. This differentiation removes the burden of customizing the robot 120 to meet a clients needs from the robot manufacturer and allows a client to emphasize client specific functionality.

In an embodiment of the disclosure, central server 110 is a computer with a processor and memory, which includes the following elements: a communication interface 111; a server frontend 112; a server backend 113; a server database 114; and a client customizing application 115.

The communication interface 111 is provided to communicate with robots 120 and client servers 130.

The server frontend 112 is where user interaction occurs. The frontend serves as an interface for communicating with robots 120, users, and client servers 130.

The server backend 113 is where the technical processes occur. The backend serves to control and execute applications on the central server 110.

The server database 114 is provided to store data such as a current robotic operation control kit 122 for providing to robots 120.

The client customizing application 115 is configured to be accessed or downloaded to client servers 130 to customize an application layer 124.

In an embodiment of the disclosure, client servers 130 are computers with a processor and memory, including the following elements: A communication interface 131, a local database 134 and an application 135.

The communication interface 131 serves to communicate with the central server 110 and with robots 120.

The local database 134 serves to store application layer 124 and other client data.

The application 135 is configured to enable a client to access client customizing application 115 on central server 110 to customize a client specific application layer 124 for robot 120. The application 135 may store the customized application in local database 134 to be provided to robot 120. Alternatively or additionally, central server 110 may provide application 115 to the client server 130 to be stored and executed locally by the client to customize the application layer 124 for robot 120.

In an embodiment of the disclosure, robot 120 includes a processor and memory configured to control and execute the following modules and elements of the robot 120: a router 121, a robotic operation control kit (Rock) 122, a scripter 123, an application layer 124, a communication broker 125, a local database 126 and features 127.

The router 121 serves for communicating with central server 110 and client servers 130.

The robotic operation control kit (Rock) 122 is provided by the central server 110 to control the basic functionality of the robot 120 when offline, for example interaction with sensors and motors of the robot 120. Optionally, the robotic operation control kit 122 may also control basic functionality when online, for example to initiate queries from central server 110 and act on instructions from the central server 110. For example the central server 110 may employ a large language module (LLM), which may be used to help the robot 120 to comprehend and respond to user communications. In some embodiments of the disclosure, the central server 110 may take control and provide the robot 120 with instructions to perform required tasks.

The application layer 124 is prepared by a client server 130 to provide client specific data and client specific functionality when offline; the application layer 124 may be stored at the client server 130 (e.g., in database 134) or at the central server 110 (e.g., in server database 114) to be provided to the robot to control offline functionality in conjunction with robotic operation control kit 122. Optionally, application layer 124 may also support online functionality, for example communication with client server 130 regarding client specific issues or with central server 110 to access specific services provided by the central server 110, for example an LLM.

The scripter 123 is responsible for managing the initial downloading and execution of the applications that comprise the robot's ability. The scripter is configured to initiate access to the central server 110 and the client server 130 and based on a unique ID of the robot identify, identify which robotic operation control kit 122 and which application layer 124 need to be downloaded by router 121 to initialize the robot 120 to serve the client that acquired the robot 120.

The communication broker 125 or brokers configured to receive communications from the robotic operation control kit 122 and distribute the communications to the features of the robot 120 or vice versa, for example to provide instructions to motors and sensors of the robot or receive measurements from them. The communication broker 125 may use message queue telemetry transport (MQTT).

The local database 126 in the memory of the robot 120 is configured to store downloaded applications and data locally at the robot 120.

The features 127 are the functions that the robot 120 activates during operation. The features are achieved using sensors, motors, gears, wheels and other software and hardware to perform the functions requested by the robotic operation control kit 122 and the application layer 124. For example: image recognition, audio recognition, navigation, speech to text (STT), text to speech (TTS), natural language processing (NLP), optical symbol recognition (OSR), optical character recognition (OCR), identifying a person's vital signs (e.g., SpO2, heart rate breathing rate, pain diagrams, brain waves, pulse rate), and other functions.

Figure 2:
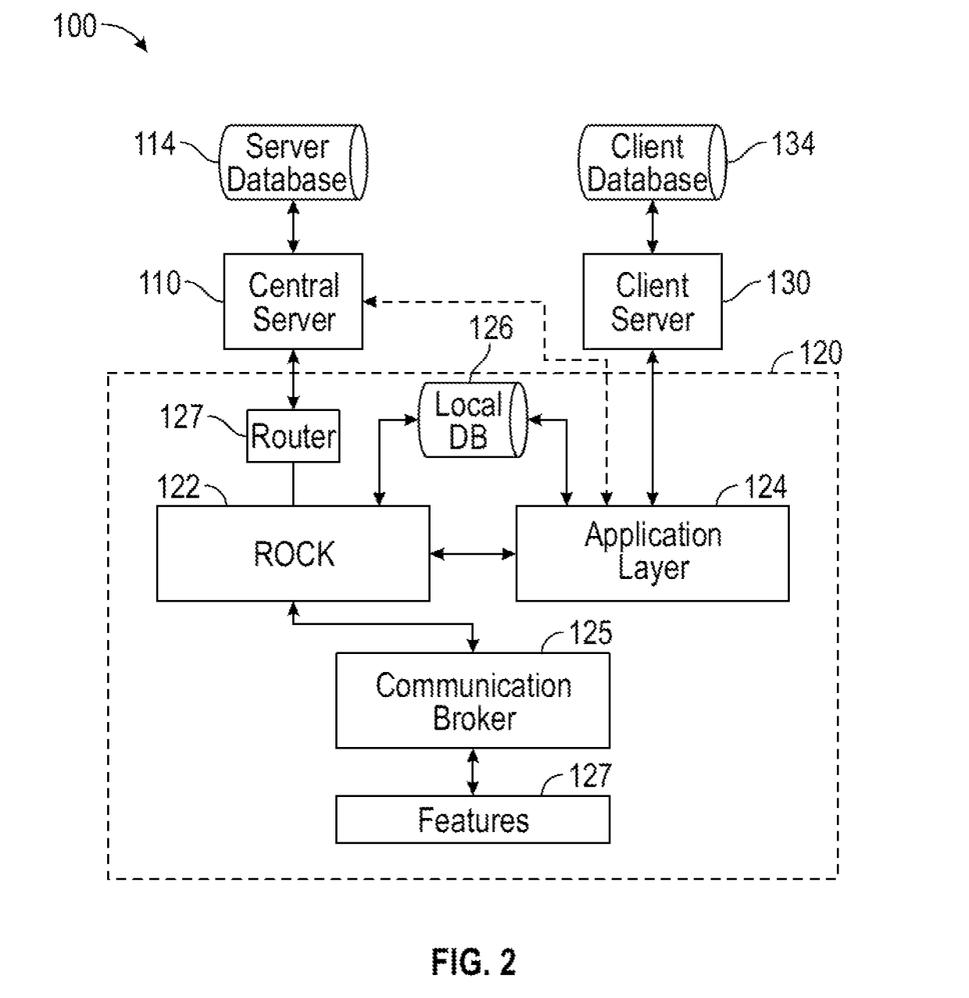
FIG. 2 is a schematic illustration of architecture of software of the system, according to an embodiment of the disclosure.

FIG. 2 is a schematic illustration of architecture of the software of system 100, according to an embodiment of the disclosure. In an embodiment of the disclosure, the application layer 124 is configured to communicate directly with the robotic operation control kit 122, and the robotic operation control kit 122 is configured to communicate and activate the features 127. Optionally, communication broker 125 serves as an intermedium between the robotic operation control kit 122 and the features 127. Various features may act independently providing data simultaneously and communication broker 125 receives the data and provides it to the robotic operation control kit 122 when it is available to act on the data. Likewise the robotic operation control kit 122 may provide instructions to various features 127 (e.g., sensors) via communication broker 125. Communication broker 125 may store the instructions in a buffer or queue and provide them to the features 127 when they are available to communicate. Likewise robotic operation control kit 122 may provide a single command that is to be delivered by the communication broker 125 to multiple sensors or motors.

In an embodiment of the disclosure, the robotic operation control kit 122 is provided from the central server 110 that represents the robot manufacturer. Optionally, the application layer 124 is prepared by a client server 130 that represents a client that uses customizing application 115 to customize the use of the robotic operation control kit 122 of the robot 120 to meet the needs of the client. For example to identify specific people, perform specific tasks and understand specific phrases and terminology when offline, since the resources of the robot 120 are limited. When online the robot 120 may be able to use heavier resources, for example to use a large language model (LLM) by querying the central server 110 or the client server 130.

In an embodiment of the disclosure, the robot is configured to function offline and online. When offline the basic functions of the robot are handled by the robotic operation control kit 122 and client specific functions are handled by the application layer 124. When online the robotic operation control kit 122 and application layer 124 may access the central server 110 or client server 130 to enhance functionality of the robot, for example providing updates and more complex functions. Optionally, the central server 110 updates the robotic operation control kit 122 and the client server 130 updates the application layer 124 with client specific data and functions, for example the update process may include adding or removing client data in the robot 120 (e.g., when a new staff member joins, face recognition photos are required, when a user leaves specific data is no longer required for face recognition and face recognition photos can be deleted, remodeling of AI modules may be required, and maps and location names may be altered).

In an embodiment of the disclosure, when online the robotic operation control kit 122 and/or application layer 124 can delegate processing to a respective server (110, 130) to provide functions that require processing power that exceeds the internal processing power of the robot 120 and/or internal storage capacity of the robot 120.

In an embodiment of the disclosure, the robot 120 includes hardware and software to sense the environment and to enable performing various functions, which may include:
 i. Speech recognition;
 ii. Natural language processing;
 iii. Vision, image processing; object recognition, face recognition, OCR (optical character recognition), reading;
 iv. Ability to move, navigation;
 v. Ability to talk
 vi. User interface on the robot screen/face.

The role of the software is to manage the hardware to provide a 'world' whereby the robot 120 can function. The software fulfills the functional specification of any given robot 120.

In an embodiment of the disclosure, the robotic operation control kit 122 includes software routines to perform the above functions. However, the robotic operation control kit 122 may be programed not to take actions unless instructed to do so by application layer 124. The application layer 124 is programed to provide the robot with a role by invoking the functions of the robotic operation control kit 122 and performing high level tasks, for example to serve as a waiter in a restaurant, or a receptionist at a medical facility.

The sensors of the robot 120 may include cameras, accelerometers, magnetometers, tactile sensors, light sensors, GPS/GNSS, microphones, gyroscopes, and other sensors. The motors may include motors, gears and wheels to control motion of the robot 120, for example move the robot's hands, feet, bend joints and the like.

In an embodiment of the disclosure, the robot 120 can serve as a clinic assistant robot, wherein the role of the robot 120 is to register patients, take vitals, escort the patient to an examination room, and assist a doctor during the examination. The robotic operation control kit 122 and application layer 124 manage all the components described above so that the robot can fulfill this functional specification. The robotic operation control kit 122 and application layer 124 create a closed and defined world for the robot to exist in.

In an embodiment of the disclosure, the robotic operation control kit 122 does not discriminate which sources to pull data from during its operation. Rather, this discrimination is handled by the application layer 124. The robotic operation control kit 122 only discriminates based on data type and not the content of the data. The types are dictated between the application layer 124 and the robotic operation control kit 122 based on a contract. The contract includes the exact terms of which data will be stored and managed, who has access to what, what are the data types, actions to take and responses to said actions, completion, cancel, abort, responses, etc. For example the data may include, location, face vectors, person, object, etc.

In an embodiment of the disclosure, "patients, doctors, and nurses" can all be 3 different sets of data under the category of "person". If the application layer 124 tells the robotic operation control kit 122 to search for "patients" and "nurses" using facial recognition, it will search for anyone that falls under the "patients" and "nurses" sets within the "person" category. It does not distinguish between patients and nurses in its search but it will not include doctors.

Optionally, the robotic operation control kit 122 will blindly return the face data of any patient or nurse that it recognizes as well as the sub-category that that person falls into to the application Layer 124. For the robotic operation control kit 122, all face recognition is the same. It has no contextual awareness of why it needs to do face recognition or who it should be trying to recognize outside of the subsets "patients" and "nurses" of the "person" category. That is the responsibility of the application layer 124.

The application layer 124 will use its higher-level logic to determine how to proceed with the information received from the robotic operation control kit 122. For example, if the robot 120 is executing a flow in which it has different logic depending on if it recognizes a patient versus a nurse (like check-in) then the application layer 124 is responsible for providing the appropriate response for a patient (e.g., beginning the check-in workflow) versus a nurse (e.g., opening a nurse menu).

There are collections that are modifiable by both the robotic operation control kit 122 and the application layer 124 (in a database a collection is an ordered group of elements having the same datatype"). There may be collections in the database that are modifiable exclusively by the robotic operation control kit 122 or exclusively by the application layer 124.

In an embodiment of the disclosure, separating between the robotic operation control kit 122 and the application layer 124 reduces manufacturer development time since the manufacturer does not deal with client specific data but rather with the general function of the robot 120. Additionally, the separation enhances control by the client since the client defines client specific data and client specific robot behavior.

In an embodiment of the disclosure, the robotic operation control kit 122 and the application layer 124 communicate with each other via data abstraction, the robotic operation control kit 122 cares about data types and not data, and the application layer 124 cares about the data. Optionally, the communication is via a "contract" dictating the data types and protocols the robotic operation control kit 122 will respond to. The application layer 124 sends the robotic operation control kit 122 commands to perform basic functions like face recognition or listen for a voice command. In turn, the robotic operation control kit 122 sends a callback back when completing its function.

In an embodiment of the disclosure, the robotic operation control kit 122 communicates exclusively with the central server 110 and the application layer 124 communicates exclusively with the client server 130. Alternatively, both communicate with the central server 110. If the robot 120 only functions online the application layer 124 can be located at the central server 110 or client server 130, however to function in offline mode the application layer 124 must be located on the robot 120.

Figure 3:
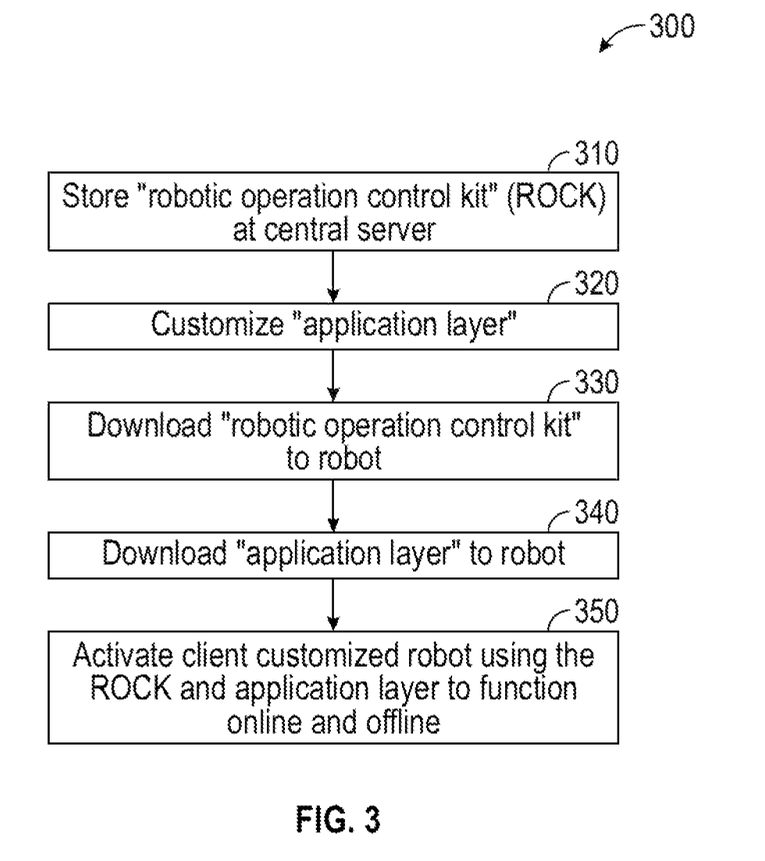
FIG. 3 is a schematic illustration of a method of preparing a client customized robot, according to an embodiment of the disclosure.

FIG. 3 is a schematic illustration of a method 300 of preparing a client customized robot 120, according to an embodiment of the disclosure. Initially, the manufacturer prepares a general application for controlling the basic functionality of the robot 120. The application is the robotic operation control kit (ROCK) 122 and is stored (310) at the central server 110. The central server 110 also hosts a client customizing application 115 that is provided to customize (320) a client application-application layer 124 by the client. The application layer 124 is configured to cooperate with the robotic operation control kit 122 to define the functionality of the robot when in online mode (with access to the central server 110) and when in offline mode, when the robot 120 must handle the environment independently.

In some embodiments of the disclosure, the client uses a client server 130 to access the customizing application 115 and customize the application layer 124, for example the customizing application 115 may be provided as a web application. Optionally, the resulting application layer 124 may be stored at the central server 110 or at the client server 130 to be provided to the robot 120. In some embodiments of the disclosure, the client server 130 may acquire/download the customizing application 115 from the central server 110 and prepare the application layer 124 locally.

The robot 120 is configured to access central server 110 and download (330) the current robotic operation control kit 122 to control functionality of the robot 120. The robot 120 is further configured to access the central server 110 or the client server 130 to download (340) the client customized application layer 124.

The robot then activates (350) the robotic operation control kit 122 in cooperation with the application layer 124 to control functionality of the robot when online and when offline. Optionally, when offline the robot 120 operates independently and when online the robot may use more processing consuming processes via the central server 110, for example LLM and ChatGPT.

In an embodiment of the disclosure, the robotic operation control kit 122 and/or application layer 124 may query the central server 110 (e.g., invoking an LLM) to receive instructions to handle a specific situation. Alternatively, or additionally, the central server 110 may cooperate with the robotic operation control kit 122 and/or application layer 124 to work in tandem. Further alternatively or additionally, the central server 110 may take control of the robot 120 providing the robot with instructions and responding to feedback.

In an embodiment of the disclosure, the robotic operations control kit 122 and/or application layer 124 can be backed up on a non-transitory memory device, for example a DVD, USB disk, external disk or other devices and can be provided physically to a robot 120 for installation and execution.

It should be appreciated that the above-described methods and apparatus may be varied in many ways, including omitting or adding elements or steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A system comprising:
a client customized robot ("robot") comprising at least one feature to enable performance of generic and client specific functions, and at least one processor, the at least one processor is configured to execute:
a robotic operation control kit to control performance of the generic functions;
an application layer to control performance of the client specific functions and provide a role to perform;
a contract to dictate data types and protocols between the robotic operation control kit and application layer; and,
a central server comprising at least one processor and a server database, the central server configured to:
store and download the robotic operation control kit and the application layer to the robot, and,
execute a client customization application to enable a client to customize the application layer prior to downloading of the application layer to the robot.

2. The system of claim 1, further comprising a client server configured to access the central server to customize the application layer prior to downloading of the application layer to the robot and to store the application layer in the server database.

3. The system of claim 1, further comprising a client server that is configured to;
customize the application layer; and
download the application layer to the robot.

4. The system of claim 1, further comprising a client server configured:
to access the central server to download client specific features;
customize the application layer with the client specific features;
store the application layer and,
download the application layer to the robot.

5. The system of claim 1, wherein the robot further comprises sensors and motors and wherein the robotic operation control kit controls access to the sensors and the motors.

6. The system of claim 5, wherein the application layer provides client data to the robotic operation control kit to enable performing client face recognition.

7. The system of claim 5, wherein the robot further comprises a communication broker configured to:
receive communications from the robotic operation control kit; and,
distribute the communication to the sensors and the motors according-to availability of the motors and the sensors.

8. The system of claim 1. wherein the robotic operation control kit and application layer are configured to delegate processing processes to the central server when the robot is functioning online.

9. The system of claim 1, wherein the robotic. operation control kit is configured to receive upgrades from the central server.

10. The system of claim 1, wherein the application layer is configured to receive upgrades from the client server.

11. A method for customizing a client customized robot ("robot") comprising at least one feature to enable performance of generic and client specific functions, the method comprising:
storing a robotic operation control kit and an application layer at a central server, wherein the robotic operation control kit is configured to control generic functions of the robot and the application layer controls the client specific functions;

receiving client customization instructions via a client customization application;

customizing the application layer according to the client customization instructions;

storing the application layer with the customizations;

downloading the robotic operation control kit and the application layer to the robot;

wherein the application layer is configured to cooperate with the robotic operation control kit to provide functionality of for the robot.

12. The method of claim 11, further comprising allowing access to a client server to enable client customization of the application layer from the client server.

13. The method of claim 11, further comprising allowing access to a client server to download the application layer thereby enabling client customization of the application layer at the client server and downloading of the application from the client server to the robot.

14. The method of claim 11, further comprising allowing access to a client server to enable the client server to:

download the customization application;

customize the application layer;

store the application layer;

download the application to the robot.

15. The method of claim 11, wherein the robotic operation control kit controls access to sensors and motors of the robot.

16. The method of claim 15, wherein the application layer provides client data to the robotic operation control kit to enable performing client face recognition.

17. The method of claim 15, wherein the robot comprises a communication broker configured to:

receive communications from the robotic operation control kit; and, distribute the communication to the sensors and the motors according to availability of the motors and the sensors.

18. The method of claim 11, wherein the robotic operation control kit and application layer are configured to delegate processing processes to the central server when the robot is functioning online.

19. The method of claim 11, wherein the robotic operation control kit is configured to receive upgrades from the central server.

20. A non-transitory computer readable storage medium comprising instruction that when executed by a computer are configured to perform the method of claim 11.

21. The system of claim 1, wherein the robotic operation control kit is configured to access the central server to invoke a large language model (LLM).

22. The method of claim 11, wherein the robotic operation control kit accesses the central server to invoke a large language model (LLM).

* * * * *